No. 793,867. PATENTED JULY 4, 1905.
S. T. WILLIAMS.
STEAM COOKER.
APPLICATION FILED OCT. 19, 1903.
2 SHEETS—SHEET 2.
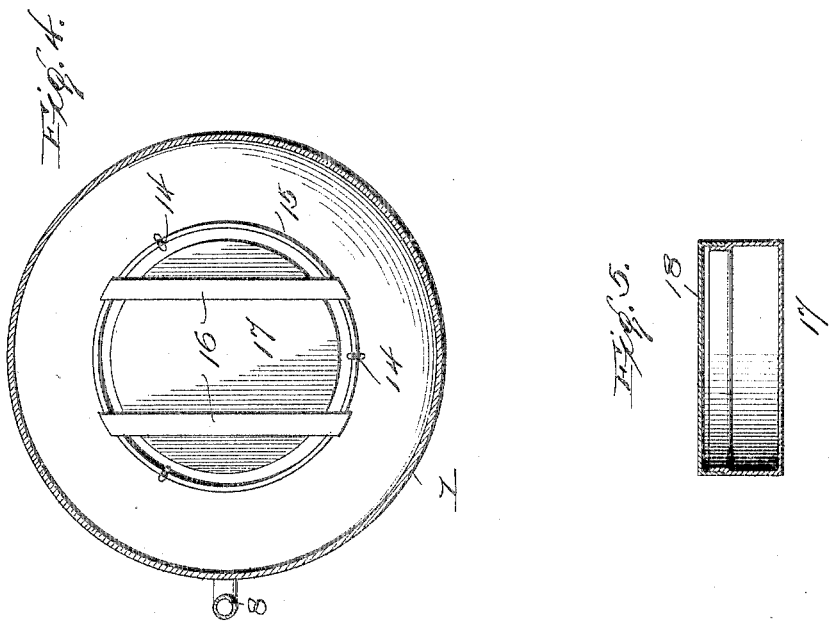
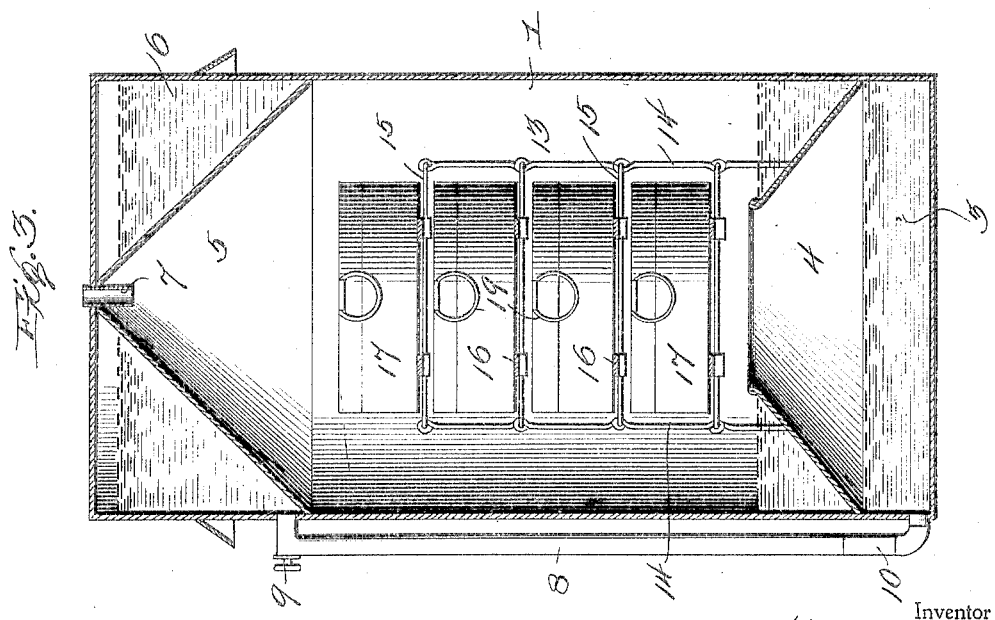
Witnesses
Inventor
S. T. Williams.
By
Attorney No. 793,867.

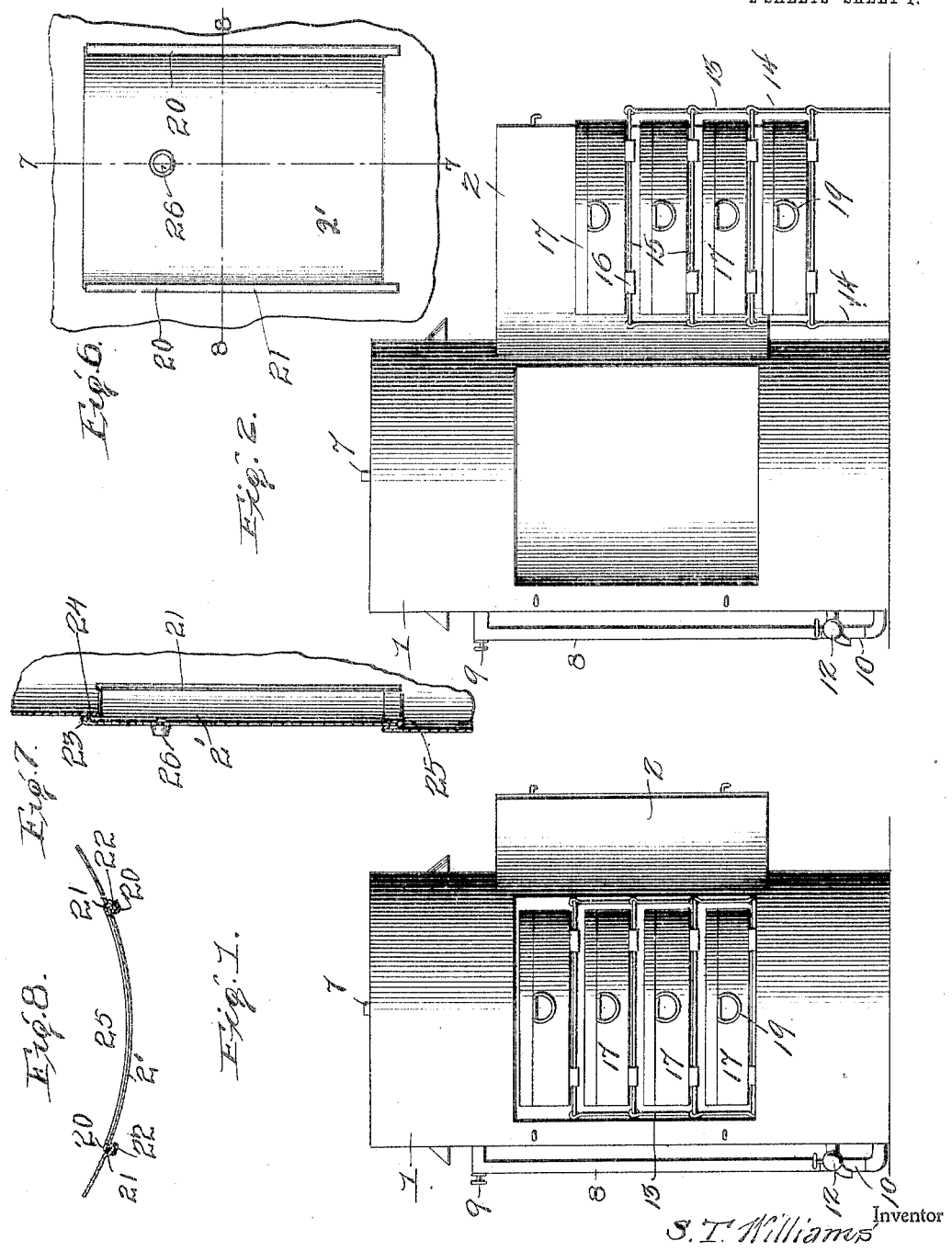

Patented July 4, 1905.

UNITED STATES PATENT OFFICE.

SAMUEL THOMAS WILLIAMS, OF ALLERTON, IOWA.

STEAM-COOKER.

SPECIFICATION forming part of Letters Patent No. 793,867, dated July 4, 1905.

Application filed October 19, 1903. Serial No. 177,611.

*To all whom it may concern:*

Be it known that I, SAMUEL THOMAS WILLIAMS, a citizen of the United States, residing at Allerton, in the county of Wayne and State of Iowa, have invented certain new and useful Improvements in Steam-Cookers; and I do declare the following to be a full, clear, and exact description of the invention, such as will enable others skilled in the art to which it appertains to make and use the same.

This invention relates to improvements in steam-cookers.

The object is to provide a cooker in which the steam used in the operation of the cooker will be condensed and a supply of distilled water formed, which may be drawn off and utilized as needed.

Another object is to provide a cooker in which the food-receptacles are steam and air tight and any one of which may be removed independent of and without disturbing the others.

A further object is to provide a cooker of this character which will be simple in construction and arrangement, strong and durable, and in which food of all kinds may be perfectly cooked.

With these and other objects in view the invention consists of certain novel features of construction, combination, and arrangement of parts, as will be more fully described, and particularly pointed out in the appended claim.

In the drawings, Figure 1 is a side elevation of the cooker, showing the door to the same open. Fig. 2 is a similar view showing the receptacles and supporting-rack removed. Fig. 3 is a vertical sectional view of the cooker; and Fig. 4 is a horizontal sectional view between two of the food-receptacles, showing the supports for the same. Fig. 5 is a vertical sectional view through one of the food-receptacles. Fig. 6 is a side elevation of the cooker, showing a modified form of door. Fig. 7 is a detail vertical sectional view on line 7 7 of Fig. 6. Fig. 8 is a horizontal sectional view on line 8 8 of Fig. 6.

Referring more particularly to the drawings, 1 denotes the outer shell or casing, which is preferably cylindrical in form and is provided in one side with an opening closed by a door 2, which has a steam-tight engagement with the sides of the cooker when in closed position and in practice is provided with means for holding the same tightly closed.

In the lower end of the cooker is arranged the boiling-water space 3, and immediately above this space is arranged an annular inclined flange 4, connected at its lower edge to the side walls of the cooker and forming a distilled-water receptacle or basin. In the upper end of the cooker is arranged a conical-shaped partition 5, which forms above the same a cold-water compartment 6. In the apex of said conical partition is fixed a vertically-disposed open tube 7, forming a ventilating air-passage communicating with the interior of the cooker and supplying fresh air to the same.

8 denotes a water-supply tube arranged on the side of the cooker and communicating at its upper end with a discharge-faucet 9, arranged in the side of the cold-water compartment and communicating at its lower end with the water-boiling space. A section of glass tubing 10 is arranged in the lower end of the pipe 8, by which the level of the water in the hot-water space may be seen.

12 denotes a faucet connected with the distilled-water compartment, through which distilled and sterilized water may be drawn for use.

13 denotes a rack, preferably formed of wire and consisting of supporting-standards 14, to which are connected a series of horizontally-disposed trays formed by circular or hoop-shaped wire rims 15 and metal crossbars 16, connected at their ends to said rims. Upon these trays are arranged the food-receptacles 17, which are in the form of pans, each having an air-tight cover 18 and a handle or ring 19, by which the same may be drawn from the trays.

In Figs. 6, 7, and 8 is shown a modified form of door 2', which in this instance has a sliding engagement with the body or casing of the cooker by means of vertically-disposed guides 20, each of which consists of a metallic strip bent or folded lengthwise upon itself to form a guideway 21 for the edge of the door 2' and a channel 22, which is adapted to closely engage the side edge of the doorway and to be secured thereto. The upper edge of the doorway is bent or folded upwardly to form a channel 23, which is adapted to receive a downwardly-projecting lip or flange 24, formed on the inner side of the upper end of the door. This flange is preferably formed by folding the upper end of the door rearwardly and downwardly upon itself, as shown. The lower edge of the doorway is folded rearwardly and downwardly upon itself and then upwardly again to form a channel 25, which is adapted to receive the lower end of the door 2' when the same is closed. Thus it will be seen that the top and bottom and side edges of the door are covered and sealed to prevent the escape of steam between the same and the edges of the doorway. A knob 26 may be connected to the door, whereby the same may be raised or lowered.

In operation the food is placed in the receptacles and the covers of the same are tightly closed. The receptacles are now placed in the casing and upon the trays of the rack 13. The door is now closed and the cooker placed upon the stove. When the water boils in the hot-water space, the steam will pass upwardly through the center of the distilled-water basin into the space occupied by the food-receptacles, where it circulates around and between the food-receptacles, heating the same and cooking the food contained therein. The steam after passing around the food-receptacles enters the steam-dome above the same and strikes the conical partition forming the bottom of the cold-water receptacle, where it condenses and runs down the inner sides of the cooker into the distilled-water basin, from which it may be drawn in a purified and sterilized condition. Thus it will be seen that the steam is made to serve a double purpose.

The air and steam tight construction of the food-receptacles prevents steam from coming into contact with the food and cooking the same in a perfect manner, preserving all the natural juices, flavors, and nutriment of the food. A cooker constructed in this manner also saves fuel when being used on oil or gas stoves, in that the food is cooked and a supply of hot sterilized water is furnished at the same time with but one burner in use.

Food prepared in a cooker of this kind cannot be burned or scorched and the odor of one food cannot mix with other food or escape into the room. The cooker cannot boil over and is supplied from the cold-water compartment through the supply-pipe as the water boils away.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

A steam cooking and distilling apparatus comprising an outer vessel having a frusto-conical partition in its lower portion provided with a central opening and forming a boiling-water space below it and a distilled-water-containing space above it, a conical partition in the upper portion of the outer vessel forming a condensing-surface and coacting with the outer vessel to form a receptacle for cold water, a valved pipe connecting said cold-water receptacle with the boiling-water space of the vessel, a rack in the outer vessel having standards bearing on and supported by the frusto-conical lower partition and further provided with cross-bars spaced vertically, and food-receptacles supported by the said cross-bars of the said racks and disposed above the central opening in the lower partition, substantially as described.

In testimony whereof I have hereunto set my hand in presence of two subscribing witnesses.

SAMUEL THOMAS WILLIAMS.

Witnesses:
G. F. WILLIAMS,
F. F. GREEN.